US00RE50827E

(19) United States
(12) Reissued Patent
Queiroz et al.

(10) Patent Number: US RE50,827 E
(45) Date of Reissued Patent: Mar. 17, 2026

(54) ONE TRIP LOCKDOWN SLEEVE AND RUNNING TOOL

(71) Applicant: Dril-Quip, Inc., Houston, TX (US)

(72) Inventors: Rodrigo Albani Queiroz, Rio de Janeiro (BR); Carlos Eduardo Martins Gaban, Rio de Janeiro (BR); Sergio Campelo Almeida, Rio de Janeiro (BR); Guilherme Pedro Eppinghaus Neto, Rio de Janeiro (BR); Fife Ellis, Cypress, TX (US)

(73) Assignee: Innovex International, Inc., Houston, TX (US)

(21) Appl. No.: 18/091,998

(22) Filed: Dec. 30, 2022

Related U.S. Patent Documents

Reissue of:

(64) Patent No.: 11,072,984
Issued: Jul. 27, 2021
Appl. No.: 16/966,835
PCT Filed: Jan. 7, 2020
PCT No.: PCT/US2020/012468
§ 371 (c)(1),
(2) Date: Jul. 31, 2020
PCT Pub. No.: WO2020/146307
PCT Pub. Date: Jul. 16, 2020

U.S. Applications:

(60) Provisional application No. 62/789,157, filed on Jan. 7, 2019.

(51) Int. Cl.

| | |
|---|---|
| ***E21B 23/02*** | (2006.01) |
| ***E21B 33/04*** | (2006.01) |
| ***E21B 33/043*** | (2006.01) |

(52) U.S. Cl.
CPC ..... *E21B 23/02* (2013.01); *E21B 33/0415* (2013.01); *E21B 33/043* (2013.01)

(58) Field of Classification Search
CPC ..... E21B 23/02; E21B 33/043; E21B 33/0415
See application file for complete search history.

(56) References Cited

U.S. PATENT DOCUMENTS 5,176,218 A 1/1993 Singer et al.
5,450,904 A * 9/1995 Galle ..... E21B 33/038 166/348

(Continued)

FOREIGN PATENT DOCUMENTS

WO 2012/018469 A1 2/2012
WO 2018/226239 A1 12/2018

OTHER PUBLICATIONS

Patents Act 1977 Examination Report under Section 18(3) in GB2210767.6 mailed Feb. 1, 2023, 4 pages.

(Continued)

*Primary Examiner* — William C Doerrler
(74) *Attorney, Agent, or Firm* — Baker Botts L.L.P.

(57) ABSTRACT

A lockdown sleeve and a running tool that may be used to install the lockdown sleeve within a wellhead in a single trip are provided. The lockdown sleeve, may include two pieces that are rotatably coupled together via threads such that the axial length of the lockdown sleeve can be adjusted by rotation of one portion of the lockdown sleeve relative to the other. The running tool may lower the lockdown sleeve into the wellhead, actuate the lockdown sleeve to lock against an inner wall of the high-pressure wellhead housing and subsequently adjust the length of the lockdown sleeve so that the lockdown sleeve is fully landed on the casing hanger and applying any desired pre-load to the connection.

92 Claims, 10 Drawing Sheets

(56) References Cited

U.S. PATENT DOCUMENTS

| | | | | |
|---|---|---|---|---|
| 6,179,053 | B1 | 1/2001 | Dallas | |
| 9,447,671 | B2 * | 9/2016 | Nguyen | E21B 43/26 |
| 10,066,456 | B2 * | 9/2018 | Berryhill | E21B 33/035 |
| 2004/0238175 | A1 | 12/2004 | Wade et al. | E21B 33/043 166/368 |
| 2011/0005774 | A1 | 1/2011 | Sinnott et al. | |
| 2013/0213671 | A1 * | 8/2013 | Reimert | E21B 33/035 166/75.13 |
| 2014/0158376 | A1 | 6/2014 | Ellis et al. | |
| 2020/0370386 | A1 * | 11/2020 | Cavanagh | E21B 33/04 |
| 2020/0399973 | A1 * | 12/2020 | Mitchell | E21B 33/0407 |
| 2021/0396090 | A1 * | 12/2021 | Murphy | E21B 33/0415 |

OTHER PUBLICATIONS

Patents Act 1977: Combined Search and Examination Report under Section 17 and 18(3) in GB2219682.8 mailed Feb. 1, 2023, 5 pages.
Patents Act 1977: Combined Search and Examination Report under Section 17 and 18(3) in GB2219681.0 mailed Feb. 1, 2023, 4 pages.
International Search Report and Written Opinion issued in related PCT Application No. PCT/US2020/012468 mailed May 6, 2020, 9 pages.

* cited by examiner

ONE TRIP LOCKDOWN SLEEVE AND RUNNING TOOL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

[The present application is] *This patent application is for a broadening reissue of U.S. Pat. No. 11,072,984. U.S. Pat. No. 11,072,984 issued Jul. 27, 2021 from U.S. application Ser. No. 16/966,835 which was filed Jul. 31, 2020 as* a U.S. National Stage Application of International Application No. PCT/US2020/012468 filed Jan. 7, 2020, which claims priority to U.S. Provisional Application Ser. No. 62/789,157 filed on Jan. 7, 2019[both of which are incorporated herein by reference in their entirety for all purposes]. *The contents of these documents are hereby incorporated by reference herein.*

TECHNICAL FIELD

The present disclosure relates generally to a lockdown sleeve and associated running tool and, more particularly, to a lockdown sleeve that can be run and secured in a wellhead in one trip.

BACKGROUND

Conventional wellhead systems include a wellhead housing and a subsurface casing string extending from the wellhead into the well bore. During a drilling procedure, a drilling riser and BOP are installed above a wellhead housing to provide pressure control as casing is installed, with each casing string having a casing hanger on its upper end for landing on a shoulder within the wellhead housing.

For various reasons, a casing hanger within the wellhead may move axially upward, particularly when the wellhead is part of a production system where downhole fluids at elevated temperatures thermally expand the casing string and thus exert a substantial upward force on the casing hanger. Since the casing hanger seal is intended for sealing at a particular location on the wellhead, upward movement of the casing hanger and the seal assembly is detrimental to reliably sealing the casing annulus. A lockdown mechanism, such as a lockdown sleeve, can be used to prevent axial movement of lire casing hanger in response to such axial forces.

Various types of lockdown sleeves have been conceived for axially interconnecting a casing hanger and a subsea wellhead. A lockdown sleeve, once run in and locked into the wellhead, prevents axial (i.e., vertical) movement of the uppermost casing hanger and seal assembly with respect to the wellhead. Typically, a lockdown sleeve is run into the wellhead on an associated running tool, landed on the casing hanger, and locked to a locking profile on an inner wall of the wellhead housing to axially secure the casing hanger within the wellhead. To install existing lockdown sleeves, it is first necessary to run a lead impression tool into the wellhead to measure the distance between the top of the casing hanger and the housing locking profile. After retrieving the lead impression tool to the surface, the measured dimension can be obtained from the leads. With this information, the lockdown sleeve length can be adjusted at the surface so that once the lockdown sleeve is run in and secured to the wellhead, it provides a zero gap connection between the casing hanger and the wellhead housing and any desired pre-load.

This process of taking measurements in the wellhead via a lead impression tool, retrieving the tool to the surface, find then adjusting and installing a lockdown sleeve into the wellhead is a time-consuming installation process requiring multiple trips into the wellhead. It is now recognized that a need exists for a lockdown sleeve and associated running tool that allow for a one-trip installation process.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
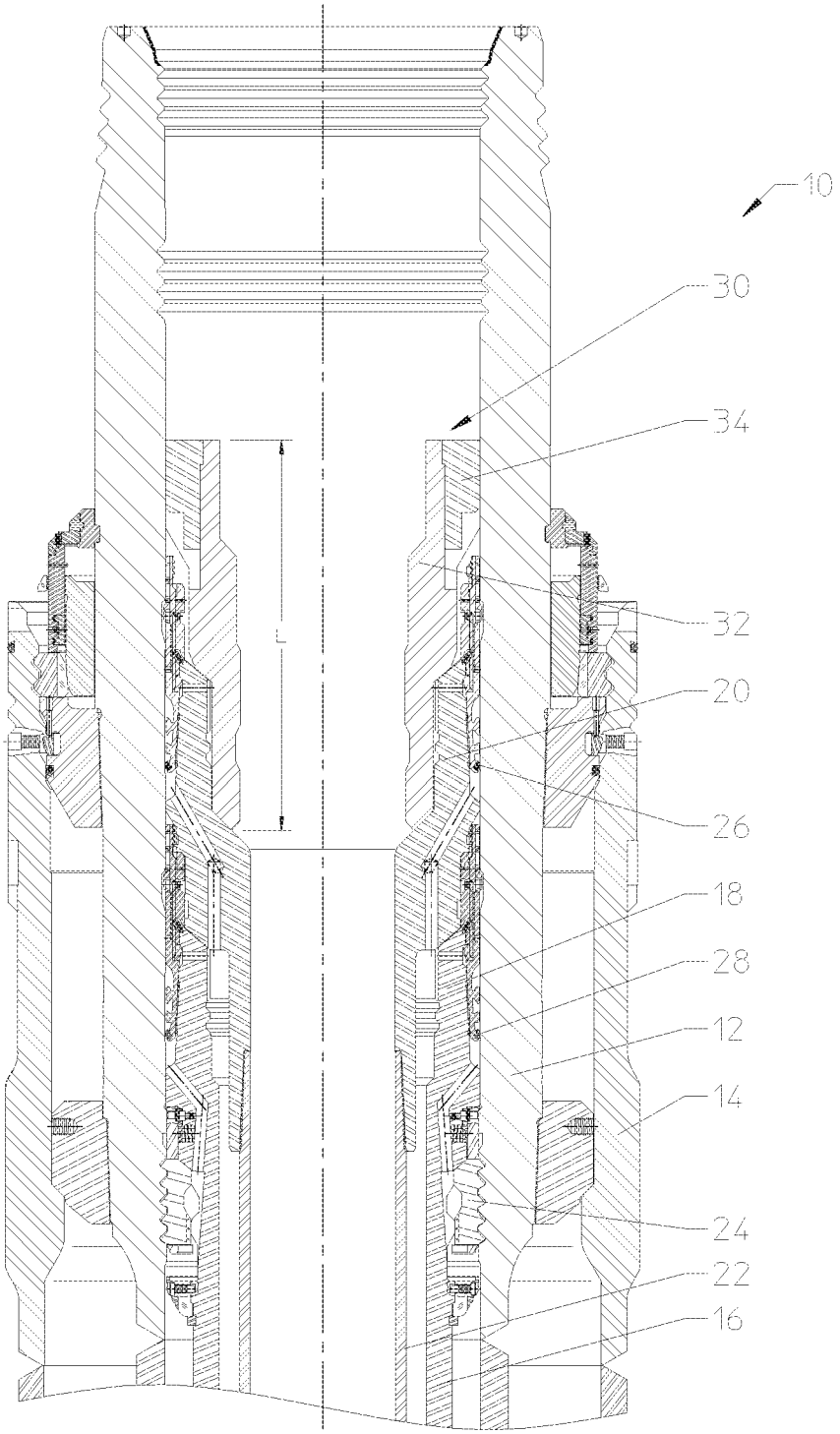
FIG. 1 is a cross-sectional view of a wellhead system having a lockdown sleeve, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments of the present disclosure may be directed to a lockdown sleeve and a running tool that may be used to install the lockdown sleeve w within a wellhead in a single trip. The lockdown sleeve may include two pieces that are rotatably coupled together via threads such that the axial length of the lockdown sleeve can be adjusted by rotation of one portion of the lockdown sleeve relative to the other. The running tool may lower the lockdown sleeve into the wellhead, actuate the lockdown sleeve to lock against an inner wall of the high-pressure wellhead housing, and subsequently adjust the length of the lockdown sleeve so that the lockdown sleeve is fully landed on the casing hanger and applying any desired pre-load to the connection. The installation process for the lockdown sleeve tray be accomplished entirely during one trip into the wellhead with the running tool and the lockdown sleeve, as opposed to a first trip with a lead impression tool followed by an adjustment of the lockdown sleeve at the surface and a subsequent trip downhole to install the adjusted lockdown sleeve. The disclosed systems and method provide both time savings (since only one trip into the wellhead is necessary) and cost savings (since an additional lead impression tool is not required) compared to existing lockdown sleeve installation techniques.

The disclosed lockdown sleeve is installed by "weight set" on the running tool string. The weight set causes the expansion of the locking ring of the lockdown sleeve into the wellhead locking profile. After the locking ring is locked to the wellhead, the length of the lockdown sleeve can be adjusted by rotation (e.g., right-hand turns) to provide zero-gap and pre-load between the casing hanger, the lockdown sleeve, and the wellhead. The length of the lockdown sleeve is adjusted/set by the running tool while inside the wellhead during installation, exempting any length pre-set on the surface. The disclosed method for installation of the lockdown sleeve using the running tool allows for a BOP test to be performed when the running tool is landed on the lockdown sleeve. All these and other advantages will be apparent based on the following description.

Turning now to the drawings, FIG. 1 illustrates certain components of a wellhead assembly 10. The illustrated wellhead assembly 10 may be a subsea wellhead assembly. However, similar techniques may be used in land-based wellhead systems as well. The wellhead assembly may include a wellhead 12 (with high-pressure housing), an outer low-pressure housing 14, a lower casing hanger 18 landed within the wellhead 12 and supporting an outer casing string 16, and an upper casing hanger 20 landed on the lower casing hanger 18 and supporting an inner casing string 22. A c-ring 24 or other attachment mechanism may support the lower casing hanger 18 and thus the outer casing 16 from the wellhead 12. A seal 26 may seal between the upper end of the upper casing hanger 20 and the wellhead 12, thereby sealing the annulus about the inner casing string 22. The lower casing hanger 18 may have its own seal 28 as well for sealing with the wellhead 12. The wellhead 12, casing strings, and casing hangers as described are functionally similar to existing wellhead and casing hanger technologies. The wellhead assembly 10 in FIG. 1 is typically used during production operations, and frequently a blowout preventer (BOP) or tieback connector is provided at the upper end of the wellhead 12.

The wellhead assembly 10 includes a lockdown sleeve 30, which prevents axial movement between the upper casing hanger 20 and the wellhead 12. The lockdown sleeve 30 locks into an internal locking profile on a bore of the wellhead 12 and lands on the upper casing hanger 20 to secure and/or provide a pre-load to the casing hanger 20 in a downward direction. FIG. 1 provides a simplified illustration of the lockdown sleeve 30, but more detailed drawings of the lockdown sleeve 30 and its constituent parts are provided in die following FIGS. 2-10. The disclosed embodiments are directed to a lockdown sleeve 30 that includes at least two portions 32 and 34, which can be rotated relative to each other to adjust an overall axial length L of the lockdown sleeve 30. An associated running tool may run the lockdown sleeve 30 into the wellhead 12, actuate the lockdown sleeve 30 so that it is locked to the wellhead housing 12, and then, while still in the wellhead, adjust the length L of the lockdown sleeve 30 so that the lockdown sleeve engages (and places any desired pre-load) on the upper casing hanger 20.

A more detailed description of the process for installing the lockdown sleeve in one trip will now be provided, with reference to FIGS. 2-10. Each of these figures shows a different step in the installation process for the lockdown sleeve 30.

FIGS. 2-10 illustrate, among other things, the high-pressure wellhead housing 12, the casing strings 16 and 22 and their associated casing hangers 18 and 20, respectively, the lockdown sleeve 30, a running tool 100, and a jet sub 102. The running tool 100 may be used to install the disclosed lockdown sleeve 30 in a single trip to the wellhead 12.

The illustrations of FIGS. 2-10 show just one half of a cross section of the various wellhead assembly components, taken on one side of a longitudinal axis 104 of the wellhead 12. As will be understood by those of ordinary skill in the art, the tools illustrated in FIGS. 2-10 extend entirely around the axis 104. The one-sided images are merely intended to simplify the drawings for a clear understanding of the various tool features.

As mentioned above, the lockdown sleeve 30 may include two portions, e.g., a lower portion 32 and an upper portion 34. The lower and upper portions 32 and 34 may be threaded together. Later during the installation process, the two portions 32 and 34 of the lockdown sleeve 30 may be rotated relative to each other to change an axial length of the lockdown sleeve 30. In addition to these two portions 32 and 34, the lockdown sleeve 30 may include a lock ring 106 connected to the upper portion 34 as well as in actuator ring 108 connected to the upper portion 34. The actuator ring 108 may function to cause the lock ring 106 to expand radially outward (with respect to axis 104) to engage a locking profile 110 on a radially inner wall of the wellhead housing 12. The lock ring 106, once in this expanded position engaged with the locking profile 110, locks the lockdown sleeve 30 to the wellhead 12. A shear pin 112 may connect the actuator ring 108 to the upper portion 34 of the lockdown sleeve 30.

Figure 2:
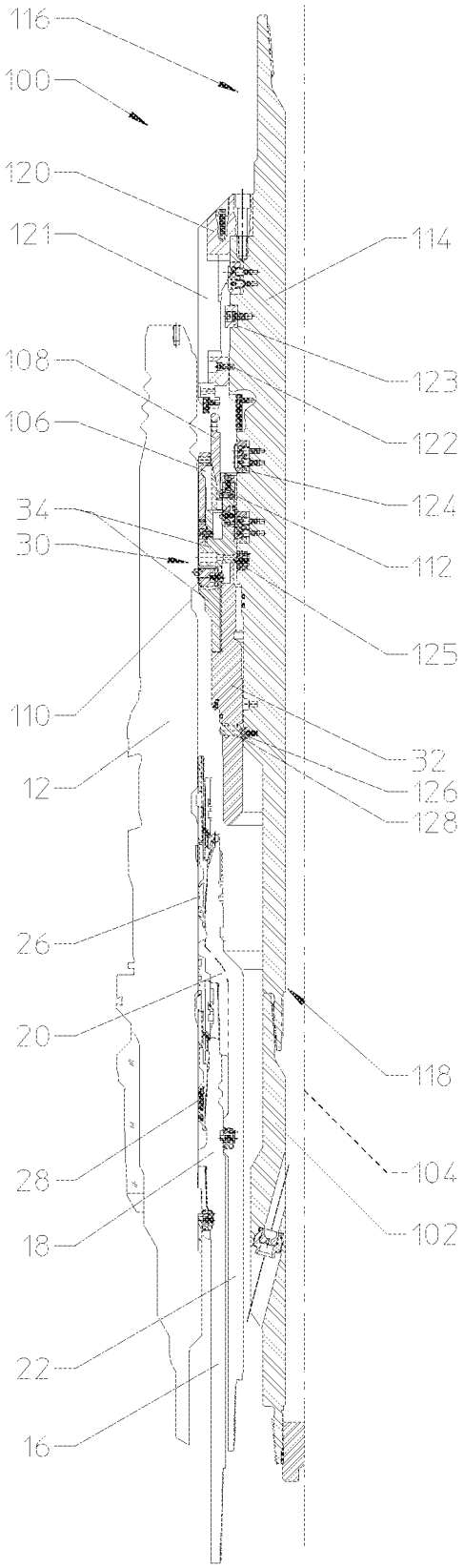
FIG. 2 is a partial cross-sectional view of an assembly including a running tool lowering a lockdown sleeve into a wellhead for a single-trip installation, in accordance with an embodiment of the present disclosure.

The running tool 100 may include a main body 114 that attaches to a tool string at its upper end 116. The main body 114, as shown in FIG. 2, may be attached at its lower end 118 to the jet sub 102. However, in other embodiments, the lower end 118 of the main body 114 may be attached to other wellbore tools or lengths of tubing, or may not be attached to anything. In addition to the main body 114, the running tool 100 includes a centralizer sub 120 coupled to and extending in a radially outward direction (with respect to axis 104) from the main body 114. The centralizer sub 120 centers the running tool 100 as it is landed in the wellhead 12. A shear pin 122 may connect the centralizer sub 120 to the main body 114 of the running tool 100. The centralizer sub 120 may have at least one axially oriented slot 121 formed therethrough, and one or more keys 123 extending from the main body 114 of the running tool 100 may extend radially outward into the slot 121. Without limitations, there may be four axially oriented slots 121 disposed 90° apart from each other. In embodiments, there may be four keys 123 disposed 90° apart from each other configured to extend into each of the respective slots 121. The key(s) 123 extending into the slot 121 on the centralizer sub 120 may maintain the centralizer sub 120 in a fixed circumferential orientation with respect to the main body 114 while allowing axial movement of die centralizer sub 120 (after shearing the shear pin 122). In one or more embodiments, the one or more keys 123 may limit upward axial movement of the centralizer sub 120 after at least one shear pin 122 is sheared. In embodiments, there may be four retractable keys disposed 90° apart from each other and above the one or more keys 123 which are responsible to fix rotational movement of the centralizer sub 120 during the trip front surface to wellhead.

The main body 114 may include one or more retractable keys 124 disposed thereon. The one or more retractable keys(s) 124 may be configured to transfer string torque to the upper portion 34 of the lockdown sleeve 30 and to adjust the length of the lockdown sleeve 30 to reach zero gap. In one or more embodiments, there may be lead blocks disposed about a bottom end of the centralizer sub 120 configured to indicate confirmation of full expansion of the lock ring 106 when the running tool 100 arrives on the surface. The lead blocks may be smashed during a turning or rotating step to reach zero gap and indicate the lockdown sleeve 30 has been installed without a gap. In embodiments, the lead blocks may be disposed 90° apart from each other and 45° out of phase of the one or more retractable keys 124.

The main body 114 may also include one or more spring-loaded pins 125 extending in a radially outward direction (with respect to axis 104) from the radially outer edge of the main body 114. A lower side of the spring-loaded pin(s) 125 may feature a sloped edge, while an upper side opposite the lower side of the spring-loaded pin(s) 125 features a straight (radially oriented) edge. That way, the spring-loaded pin 125 is able to float over grooves/shoulders in the lockdown sleeve 30 when being moved in an axially downward direction relative to the lockdown sleeve 30, but then can be caught against these grooves/shoulders when being moved in an axially upward direction. Multiple spring-loaded pins 125 may be positioned at different circumferential positions around the main body 114 (all at the same axial location). The one or more spring-loaded pins 125 may be retractable shear pins configured to lock the lockdown sleeve 30 on the running tool 100 once the running tool 100 has landed in the lockdown sleeve 30.

The running tool 100 may also include a lock ring 126 (or other similar locking component) that is captured within a circumferential recess (or groove) formed in the main body 114. The lock ring 126 may be biased in a radially outward direction (with respect to axis 104) such that the lock ring 126 is able to expand partially into a corresponding circumferential recess (or groove) 128 formed in the lower portion 32 of the lockdown sleeve 30 whenever the recess 128 is axially aligned with the lock ring 126. When the running tool 100 is positioned relative to the lockdown sleeve 30 such that the lock ring 126 is not axially aligned with the recess 128 in the lockdown sleeve 30, the lock ring 126 is collapsed radially inwardly and held entirely within the corresponding recess of the main body 114. The lock ring 126 may function to keep the lockdown sleeve 30 in a fixed axial position with respect to the main body 114 of the running tool 100 until a time when it is desired to actuate the lockdown sleeve 30 in the wellhead 12.

FIG. 2 shows the beginning of an installation process for the disclosed lockdown sleeve 30 using the associated running tool 100. The disclosed installation process may begin with lowering the running tool 100 into the wellhead with the lockdown sleeve 30 disposed thereon. The jet sub 102 may be connected below the running tool 100 and used to perform a jetting operation on the wellhead 12 as needed. If the jet sub 102 is connected to the running tool 100, the installation process may involve jetting the wellhead 12 using the jet sub 102 before further lowering the running tool 100 through the wellhead 12 with the attached lockdown sleeve 30.

Figure 3:
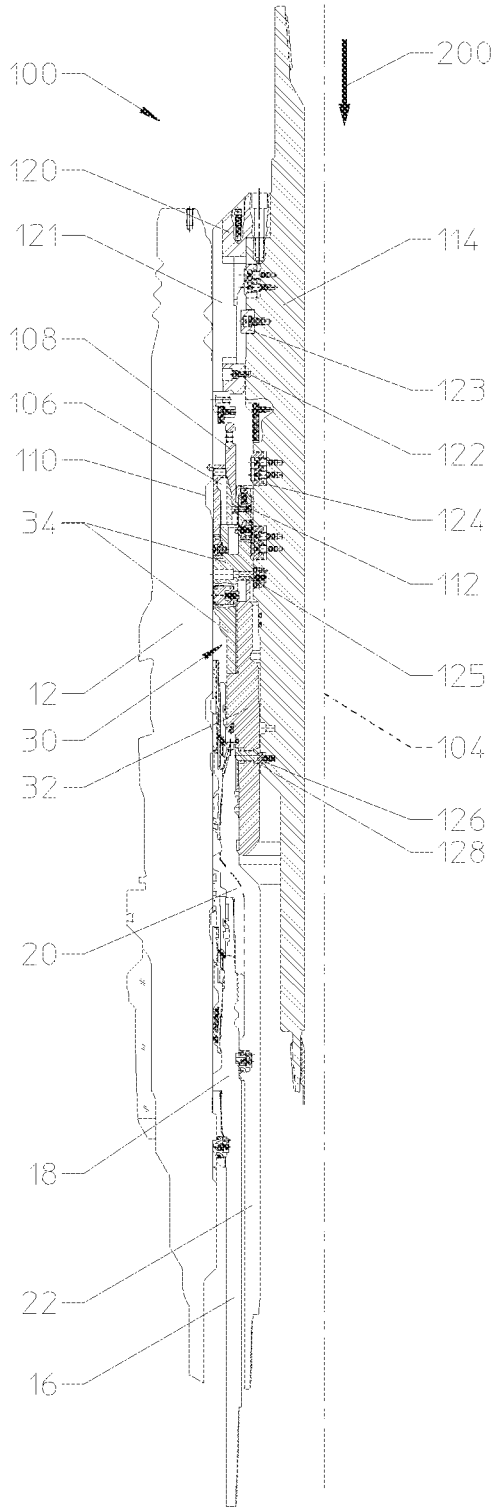
FIG. 3 is a partial cross-sectional view of die assembly of FIG. 2 expanding a lock ring to allow axial movement of the running tool with respect to the lockdown sleeve, in accordance with an embodiment of the present disclosure.

After the jetting operation is completed, the installation process then involves further lowering and landing the lockdown sleeve 30, as shown in FIG. 3. Note that the following illustrations of FIGS. 3-10 do not show the jet sub 102. This is merely to simplify the drawings and not an indication that the jet sub 102 has been removed during the installation process. As discussed above, the entire lockdown sleeve installation process takes place via a single trip into the wellhead 12.

FIG. 3 shows the main body 114 of the running tool 100 being released from the lower portion 32 of the lockdown sleeve 30 to enable axial movement between the running tool 100 and the lockdown sleeve 30. Specifically, the lock ring 126 is retracted radially inward into the corresponding recess of the main body 114 in response to a small amount of weight being set down on the running tool 100. This unlocks the main body 114 from the lockdown sleeve 30, enabling axial movement of the running tool 100 with respect to the lockdown sleeve 30. Once the running tool 100 is unlocked from the lockdown sleeve 30, the main body 114 and attached centralizer sub 120 can move downward (arrow 200) relative to the lockdown sleeve 30, as shown.

Figure 4:
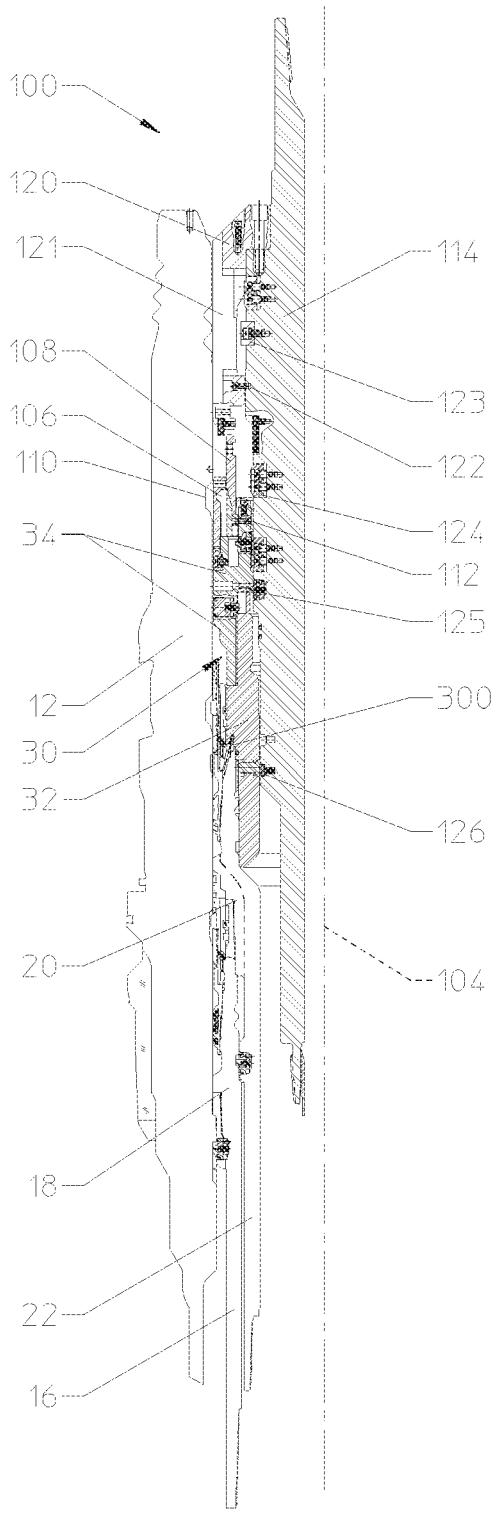
FIG. 4 is a partial cross-sectional view of the assembly of FIGS. 2 and 3 landing the lockdown sleeve on a casing hanger, in accordance with an embodiment of the present disclosure.

At some point, the centralizer sub 120 of the running tool 100 engages an upper end of the actuator ring 108 and pushes the lockdown sleeve 30 in a downward direction as well. This presses the lockdown sleeve 30 toward a landing shoulder 300 of the upper casing hanger 20. FIG. 4 shows the lockdown sleeve 30 in a fully landed position against the shoulder 300 of the casing hanger 20.

Figure 5:
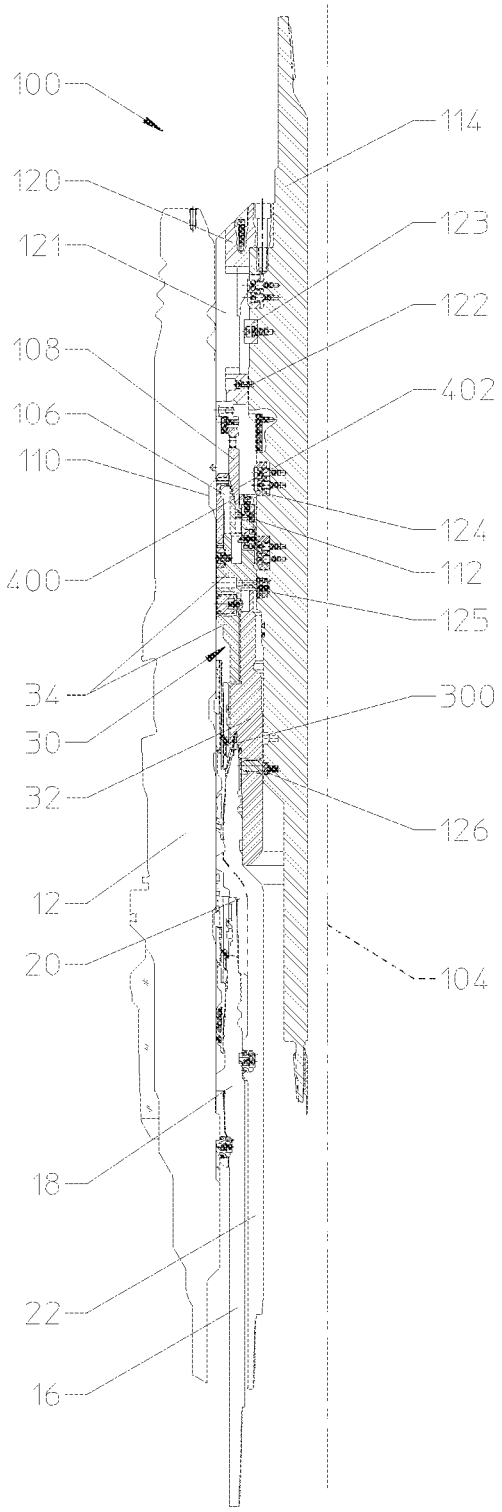
FIG. 5 is a partial cross-sectional view of the assembly of FIGS. 2-4 shearing a pin to enable movement of an actuator sleeve, in accordance with an embodiment of the present disclosure.

After initially landing the lockdown sleeve 30 via the running tool 100, additional weight of the running string is applied to (set down on) the running tool 100. As shown in FIG. 5, this additional weight causes the running tool 100 to move axially downward relative to the lockdown sleeve 30. The centralizer sub 120 of the running tool 100 transfers this axial downward force onto the actuator ring 108 of the lockdown sleeve 30, since the lockdown sleeve 30 is held stationary via the landing shoulder 300 of the casing hanger 20. As more force is applied to the actuator ring 108, the shear pin 112 located between the actuator ring 108 and the upper portion 34 of the lockdown sleeve 30 is sheared. As a result, the actuator ring 108 is able to move axially relative to the upper portion 34 under the force of the running tool 100 to start an expansion of the lockdown sleeve lock ring 106 on the high pressure wellhead housing 12.

The interface between the actuator ring 108 and the lock ring 106 may include any profile that transfers downward axial force from the actuator ring 108 into outward radial expansion of the lock ring 106. For example, as shown, the actuator ring 108 may include a sloped wall 400 that slopes in a radially inward direction (with respect to axis 104) as it moves axially downward, and the lock ring 106 may include a complementary sloped wall 402. In general, the lock ring 106 is a component that is biased in a radially inward direction but is actuatable in response to axially downward movement of the actuator ring 103. As the actuator ring 108 moves downward with respect to the lock ring 106, the lock ring 106 is forced to flex radially outward into the locking profile 110 of the wellhead 12. In embodiments, there may be one or more retractable shear pins configured to lock the actuator ring 108 and to prevent the lock ring 106 from moving back if the actuator ring 108 is displaced back upward once it is in a fully downward position. The lock ring 106 may be a solid band of material that extends circumferentially almost entirely around the lockdown sleeve 30, but with a small break in the circumference to enable the lock ring 106 to flex radially outward (e.g., a C-ring). In other embodiments, the lock ring 106 may have a collet-type construction that enables outward flexing of multiple fingers that are received in the locking profile 110. Other types of lock rings arc possible in other embodiments as well.

Figure 6:
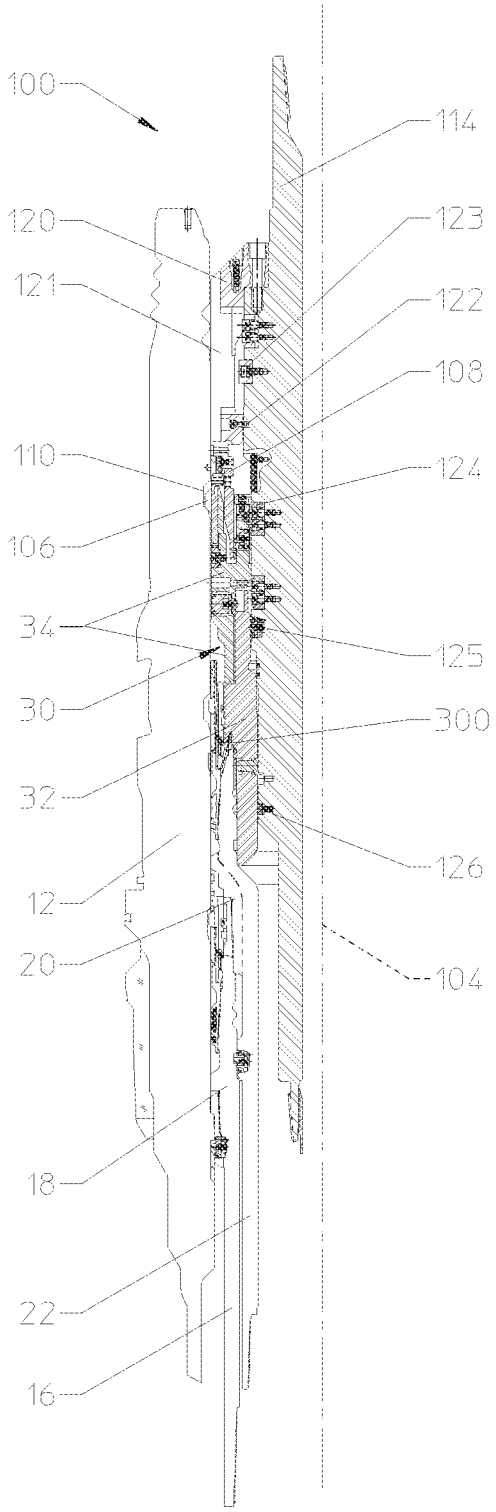
FIG. 6 is a partial cross-sectional view of the assembly of FIGS. 2-5 expanding a lock ring of the lockdown sleeve into a locking profile of the wellhead housing, in accordance with an embodiment of the present disclosure.

In FIG. 6, the lock ring 106 is fully expanded into the locking profile 110 of tire wellhead 12, in response to the running tool string load being applied to the running tool 100. The axial movement of the running tool 100 with respect to the lockdown sleeve 30 during this lock ring actuation step brings the one or more retractable keys 124 on the main body 114 into contact with the upper portion 34 of the lockdown sleeve 30. This causes the lead blocks at the bottom end of centralizer sub 120 to be fully smashed when the lock ring 106 is fully expanded. At this time the lockdown sleeve 30 may be locked on the wellhead 12 with its full lock-down capacity.

Once the lock ring 106 is fully set in the locking profile 110, the centralizer sub 120 is halted from further downward movement. Increased weight down on the running tool 100 at this point causes the shear pin 122 between the main body 114 and the centralizer sub 120 to shear. This enables axial movement of the main body 114 of the running tool 100 relative to the centralizer sub 120 until the running tool 100 is fully landed. Although axial movement is allowed, keys 123 allow centralizer sub 120 upward axial movement to install the lockdown sleeve 30 and avoid the centralizer sub 120 to disassemble from the main body 114. The one or more retractable keys 124 placed just above keys 123 prohibit centralizer sub 120 rotation during the trip to wellhead 12, but after the shear pins 122 are sheared, the centralizer sub 120 may travel up and disengage from the one or more retractable keys 124. At this point, the centralizer sub 120 may centralize the main body 114 but also allow main body 114 to transfer the rotation of the string to the upper portion 34 of the lockdown sleeve 30.

Figure 7:
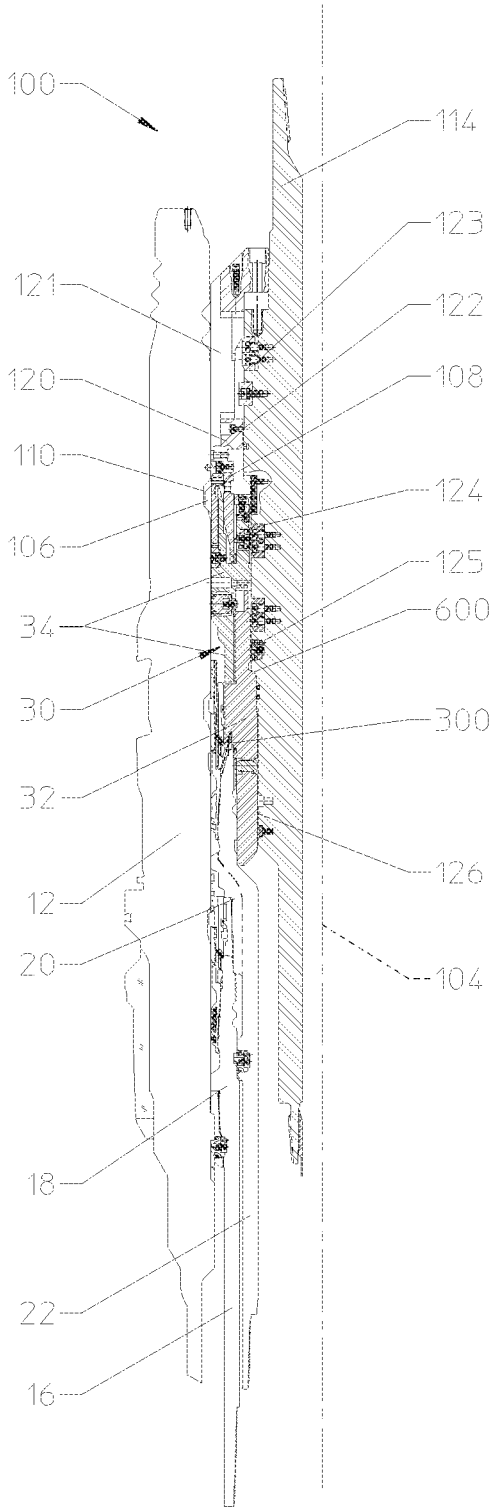
FIG. 7 is a partial cross-sectional view of the assembly of FIGS. 2-6 shearing a pin to release a centralizer sleeve from a main body of the running tool, in accordance with an embodiment of the present disclosure.

FIG. 7 shows the running tool 100 in this fully landed position, with the main body 114 landed on a load shoulder 600 on the lower portion 32 of the lockdown sleeve 30. At this point, the string load may be slacked off the running tool 100.

All the downward weight that was previously transferred through the running tool 100 to the lockdown sleeve 30 during the landing process may cause the lock ring 106 to be engaged with a lowermost edge of the locking profile 110, as shown. This is not desirable, since the lockdown sleeve 30 is intended to axially lock the casing hanger 20 to the wellhead 12 and this lock ring 106 placement at the lower edge of the locking profile 110 may enable upward axial movement of the casing hanger 20. As such, the method further includes adjusting an axial length of the lockdown sleeve 30 so that the lockdown sleeve 30 is engaged with both an upper edge of the locking profile 110 on the wellhead 12 and the shoulder 300 of the casing hanger 20 and applying any desired preload to the casing hanger connection.

Figure 8:
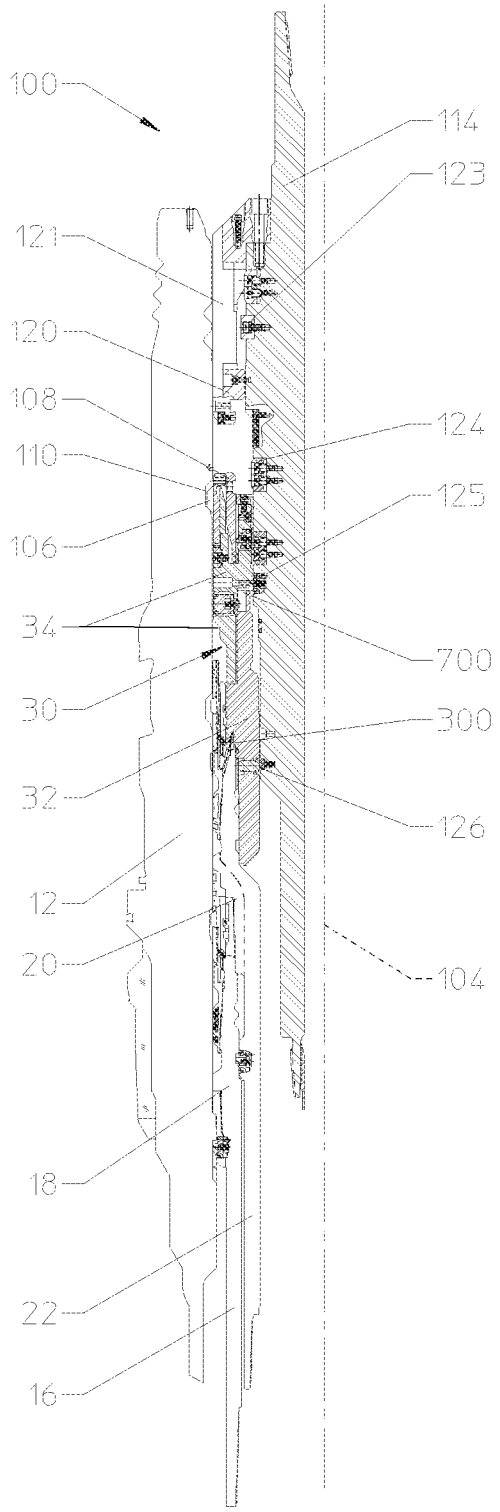
FIG. 8 is a partial cross-sectional view of the assembly of FIGS. 2-7 applying an overpull to the lockdown sleeve to confirm that the lockdown sleeve is secured to the wellhead, in accordance with an embodiment of the present disclosure.

Before adjusting the axial length of the lockdown sleeve 30, it may be desirable to perform an overpull operation on the lockdown sleeve 30 to ensure that it has landed in the correct position and is locked to the high-pressure wellhead housing 12. This overpull operation is shown in FIG. 8. The running tool 100 is pulled upward from the surface, causing the running tool 100 to move axially upward with respect to the locked lockdown sleeve 30. As the main body 114 of the running tool 100 runs along a radially inner surface of the lockdown sleeve 30, the spring-loaded pin 125 is biased radially outward into a groove 700 within the lockdown sleeve 30. The straight edge of the spring-loaded pin 125 may transfer an upward pulling force to the upper portion 34, and therefore the lock ring 106, of the lockdown sleeve 30. If the lock ring 106 is properly seated in the locking profile 110, the running tool 100 will be caught via this interaction with the spring-loaded pin 125, thereby confirming to an operator at the surface that the lockdown sleeve 30 is set correctly.

Figure 9:
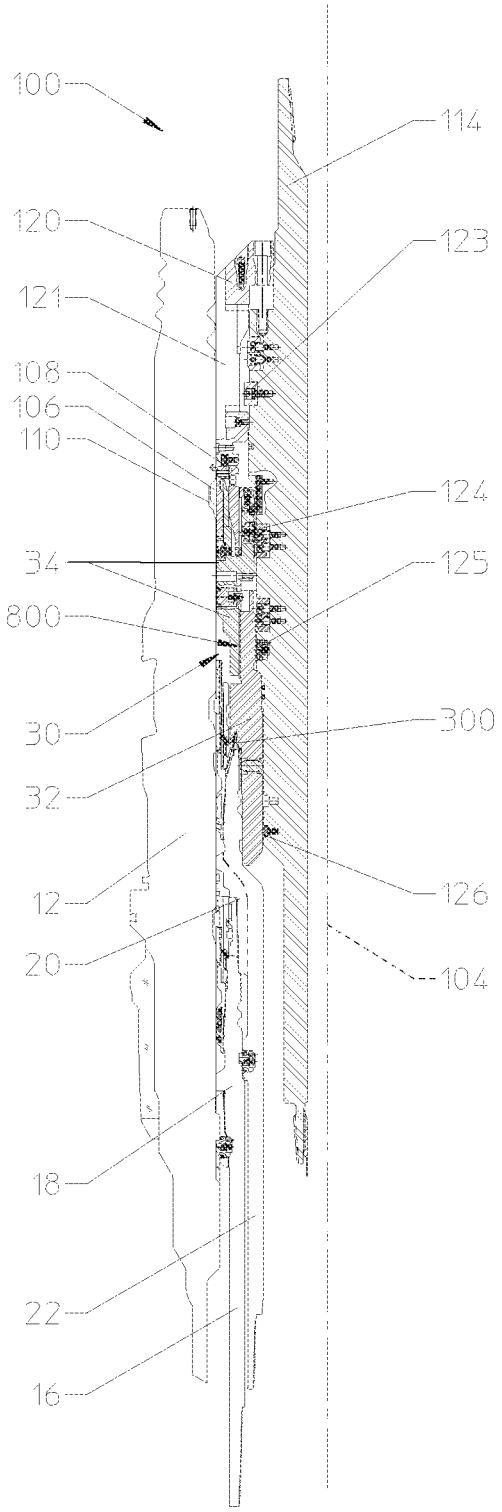
FIG. 9 is a partial cross-sectional view of the running tool of FIGS. 2-8 adjusting an axial length of the lockdown sleeve within the wellhead, in accordance with an embodiment of the present disclosure.

Once it is confirmed that the lockdown sleeve 30 is properly locked to the wellhead housing 12, it is desired to adjust the axial length of the lockdown sleeve 30. This may be accomplished via right-hand turns of the running tool 100 while again putting weight down on the running tool 100. Once the shear pins 120 have been sheared, the centralizer sub 120 may disengage with the main body 114 so that the main body 114 may be rotatable without interference from the centralizer sub 120. Rotating the running tool 100 may cause the upper portion 34 to rotate via the one or more retractable keys 124 with respect to the lower portion 32 of the lockdown sleeve 30. With weight down on the running tool 100 and lockdown sleeve 30, the lower portion 32 of the lockdown sleeve remains stationary with respect to the wellhead 12 while the upper portion 34 of the lockdown sleeve 30 is rotated. In embodiments, there may be one or more retractable keys disposed between the lower portion 32 and the upper casing hanger 20. These one or more retractable keys may be configured to keep lower portion 32 stationary with respect to the upper portion 34. This rotation causes the upper portion 34 to ride up threads 800 at the threaded connection between the upper and lower portions 34 and 32 of the lockdown sleeve 30, as shown in FIG. 9. This adjusts the axial length of the lockdown sleeve 30 until it readies a zero-gap position (i.e., where the lock ring 106 is engaged with an upper edge of the locking profile 110 in the wellhead 12 and the lower portion 32 is engaged with the landing shoulder 300). Rotation may continue even after this zero-gap point is reached to apply a desired pre-load to tire casing hanger connection. Once the lockdown sleeve 30 length has been adjusted, the running tool 100 is now ready to test the BOP (not shown) during the same trip.

Figure 10:
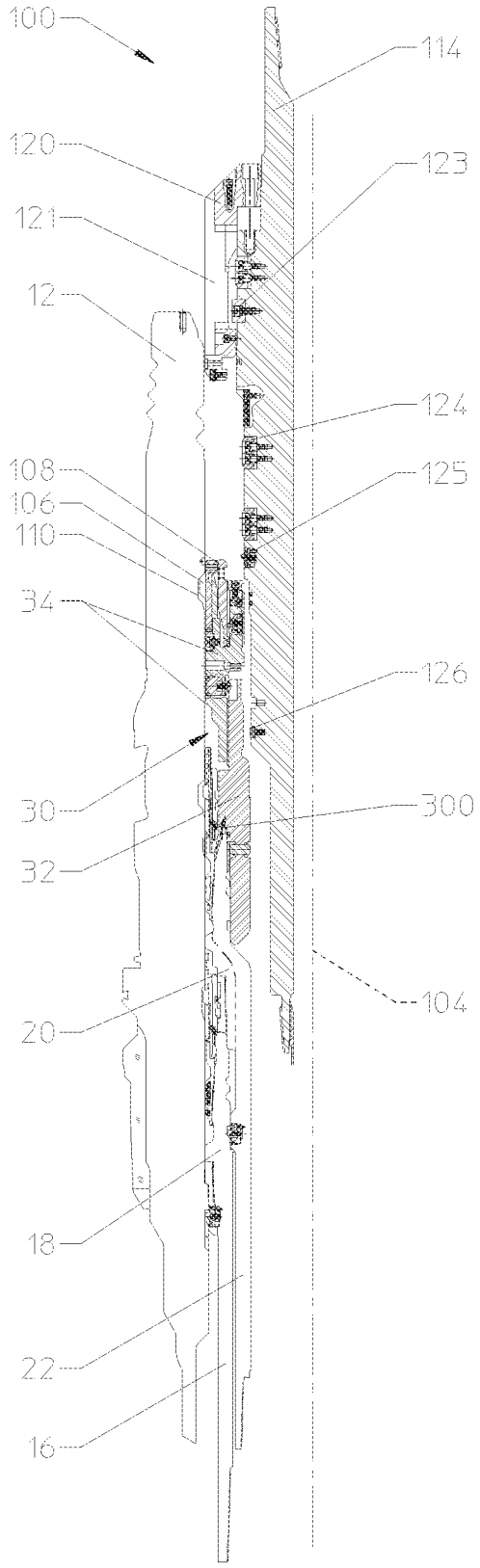
FIG. 10 is a partial cross-sectional view of the running tool of FIGS. 2-9 being retrieved to the surface while the lockdown sleeve is fully installed, in accordance with an embodiment of the present disclosure.

After installing the lockdown sleeve, and possibly testing the BOP, the running tool 100 may be retrieved to the surface. Specifically, the running tool 100 may be pulled upward (as during the overpull step described above) until the overpull force causes the spring-loaded pin 125 to be sheared, thereby releasing the running tool 100 from the lockdown sleeve 30. As shown in FIG. 10, the running tool 100 may then be retrieved to the surface, leaving the fully installed, zero-gap lockdown sleeve 30 in the wellhead 12. Again, this entire installation is accomplished during a single trip to the wellhead 12 via the running tool 100. The installation is performed without requiring a separate lead impression tool to be lowered to the wellhead to determine measurements for a subsequent surface-level adjustment of the lockdown sleeve.

Although the present disclosure and its advantages have been described in detail, it should be understood that various changes, substitutions and alterations can be made herein without departing from the spirit and scope of the disclosure as defined by the following claims.

What is claimed is:

1. A system, comprising:

a lockdown sleeve comprising a lower portion and an upper portion connected together via threads that enable axial lengthening of the lockdown sleeve in response to rotation of the upper portion relative to the lower portion; and a running tool, wherein the running tool is configured to install the lockdown sleeve into a wellhead and adjust the axial length of the lockdown sleeve while the lockdown sleeve is in the wellhead, wherein the running tool comprises:

a main body, wherein an upper end of the main body is attached to a tool string;

a centralizer sub, wherein the centralizer sub is coupled to and extending in a radially outward direction from the main body, wherein the centralizer sub is coupled to the main body; and a lock ring contained within a circumferential recess formed in the main body.

2. The system of claim 1, wherein the lockdown sleeve further comprises a second lock ring connected to the upper portion and an actuator ring connected to the upper portion, wherein a shear pin connects the actuator ring to the upper portion.

3. The system of claim 2, further comprising the wellhead, wherein the wellhead comprises a locking profile disposed on a radially inner wall of the wellhead to receive the second lock ring of the lockdown sleeve.

4. The system of claim 1, wherein the main body comprises one or more spring-loaded pins extending in a radially outward direction from an outer edge of the main body.

5. The system of claim 4, wherein the one or more spring-loaded pins comprise a lower side with a sloped edge and an upper side opposite the lower side with a straight edge aligned in a radial direction.

6. The system of claim 5, wherein the lockdown sleeve further comprises a groove configured to receive the one or more spring-loaded pins.

7. The system of claim 1, wherein the lower portion of the lockdown sleeve comprises a circumferential recess, wherein the lock ring is biased in a radially outward direction such that the lock ring is configured to expand partially into the circumferential recess of the lower portion.

8. The system of claim 1, further comprising one or more keys extending from the main body into a slot formed on the centralizer sub to maintain the centralizer sub in a fixed circumferential orientation with respect to the main body while limiting upward axial movement of the centralizer sub.

9. The system of claim 1, further comprising a casing hanger disposed within the wellhead, wherein the casing hanger comprises a landing shoulder configured to receive the lower portion of the lockdown sleeve.

10. The system of claim 1, wherein the lower portion of the lockdown sleeve comprises a load shoulder configured to support the running tool.

11. A method, comprising:

disposing a running tool downhole into a wellhead, wherein the running tool comprises a main body, wherein a lockdown sleeve is coupled to the running tool, wherein the lockdown sleeve comprises a lower portion and an upper portion connected together via threads that enable axial lengthening of the lockdown sleeve in response to rotation of the upper portion relative to the lower portion;

landing the lower portion of the lockdown sleeve onto a shoulder of a casing hanger disposed within the wellhead;

displacing a lock ring on the upper portion of the lockdown sleeve into a locking profile of the wellhead;

landing the running tool on a load shoulder of the lower portion of the lockdown sleeve; and rotating the running tool to adjust the axial length of the lockdown sleeve, wherein rotating the running tool causes a centralizer sub and the upper portion of the lockdown sleeve to rotate with respect to the lower portion of the lockdown sleeve, wherein the lower portion of the lockdown sleeve remains stationary with respect to the wellhead.

12. The method of claim 11, further comprising:

putting weight down on the running tool;

retracting a secondary lock ring radially inward into a corresponding recess of the main body of the running tool in response to putting weight down on the running tool; and axially displacing the running tool with respect to die lockdown sleeve after retracting the secondary lock ring.

13. The method of claim 11, further comprising engaging the centralizer sub of the running tool with an upper end of an actuator ring of the lockdown sleeve.

14. The method of claim 13, further composing shearing a shear connection located between the main body and the centralizer sub upon applying a downward force on the running tool after displacing the lock ring into the locking profile of the wellhead.

15. The method of claim 13, wherein displacing the lock ring comprises translating the actuator ring downward with respect to the lock ring, thereby forcing the lock ring to flex radially outward into the locking profile of the wellhead.

16. The method of claim 13, wherein pushing the lockdown sleeve in the downward direction lands the lower portion of the lockdown sleeve on the shoulder of the casing hanger and shears a shear connection located between the actuator ring and the upper portion of the lockdown sleeve.

17. The method of claim 11, further comprising performing an overpull operation by translating the running tool axially upward with respect to the lockdown sleeve after displacing the lock ring into the locking profile of the wellhead.

*18. A system; comprising:*

*a lockdown sleeve configured to retain a casing hanger within a wellhead, the lockdown sleeve comprising:*

*a first portion; and*

*a second portion coupled to the first portion;*

*wherein the first and second portions are rotatable with respect to each other to change an axial length of the lockdown sleeve; and*

*a running tool, wherein the running tool is configured to install the lockdown sleeve into a wellhead and adjust the axial length of the lockdown sleeve while the lockdown sleeve is in the wellhead, wherein the running tool comprises:*

*a main body, wherein an upper end of the main body is attached to a tool string;*

*a centralizer sub, wherein the centralizer sub is coupled to and extending in a radially outward direction from the main body, wherein the centralizer sub is coupled to the main body; and*

*a lock ring contained within a circumferential recess formed in the main body.*

*19. The system of claim 18, wherein the first and second portions are threaded together.*

*20. The system of claim 18, wherein the first and second portions are each substantially cylindrical in shape.*

*21. The system of claim 18, wherein the lockdown sleeve further comprises:*

*a lock ring connected to the second portion; and*

*an actuator ring connected to the second portion;*

*wherein an interface between the actuator ring and the lock ring is capable of transferring an axial force from the actuator ring into outward radial expansion of the lock ring.*

*22. The system of claim 21, wherein the lockdown sleeve further comprises a shear pin connecting the actuator ring to the second portion.*

*23. The system of claim 21, wherein the interface between the actuator ring and the lock ring comprises a pair of complementary sloped walls on the actuating ring and the lock ring.*

*24. The system of claim 21, wherein the lock ring is biased in a radially inward direction.*

*25. The system of claim 21, wherein the lock ring comprises a solid band of material that extends circumferentially partially around the lockdown sleeve with a break in a circumference thereof to enable the lock ring to flex radially outward.*

*26. The system of claim 21, wherein the lock ring has a collet-type construction that enables outward flexing of multiple fingers of the lock ring.*

*27. A system, comprising:*

*a lockdown sleeve capable of retaining a casing hanger within a wellhead and of limiting axial movement between the casing hanger and the wellhead by providing a connection between the casing hanger, lockdown sleeve, and wellhead, wherein the connection is provided via axial adjustment of the length of the lockdown sleeve; and*

*a running tool, wherein the running tool is configured to install the lockdown sleeve into a wellhead and adjust the axial length of the lockdown sleeve while the lockdown sleeve is in the wellhead, wherein the running tool comprises:*

*a main body, wherein an upper end of the main body is attached to a tool string;*

*a centralizer sub, wherein the centralizer sub is coupled to and extending in a radially outward direction from the main body, wherein the centralizer sub is coupled to the main body; and*

*a lock ring contained within a circumferential recess formed in the main body.*

*28. The system of claim 27, wherein the lockdown sleeve is capable of limiting axial movement between the casing hanger and the wellhead by applying a pre-load, wherein the pre-load is applied via the axial adjustment of the length of the lockdown sleeve.*

*29. The system of claim 28, wherein the lockdown sleeve comprises two portions that can be moved relative to each other to provide the axial adjustment.*

*30. The system of claim 29, wherein the two portions of the lockdown sleeve are rotatable with respect to each other to provide the axial adjustment.*

*31. The system of claim 30, wherein the two portions of the lockdown sleeve are threaded together.*

*32. The system of claim 28, wherein the lockdown sleeve comprises:*

*a lock ring; and*

*an actuator ring;*

*wherein the actuator ring functions to cause the lock ring to expand radially outward to engage a locking profile on a radially inner wall of the wellhead.*

*33. The system of claim 32, wherein the lock ring is configured to flex generally radially outward in response to a downward movement of the actuator ring relative to the lock ring.*

*34. The system of claim 33, wherein the lockdown sleeve comprises a retractable shear pin configured to prevent the lock ring from moving back from the locking profile if the actuator ring is displaced upward after it was in a downward position.*

*35. The system of claim 27, wherein the lockdown sleeve comprises a lower portion for interfacing directly with the casing hanger.*

*36. The system of claim 27, wherein the lockdown sleeve comprises a retractable key capable of interfacing with an inner diameter of the casing hanger.*

*37. A system, comprising:*

*a lockdown sleeve capable of retaining a casing hanger within a wellhead and of limiting axial movement between the casing hanger and the wellhead by applying a pre-load, wherein the pre-load is applied via axial adjustment of the length of the lockdown sleeve; and*

*a running tool, wherein the running tool is configured to install the lockdown sleeve into a wellhead and adjust the axial length of the lockdown sleeve while the lockdown sleeve is in the wellhead, wherein the running tool comprises:*

*a main body, wherein an upper end of the main body is attached to a tool string;*

*a centralizer sub, wherein the centralizer sub is coupled to and extending in a radially outward direction from the main body, wherein the centralizer sub is coupled to the main body; and*

*a lock ring contained within a circumferential recess formed in the main body.*

*38. A system, comprising:*

*a lockdown sleeve configured to retain a casing hanger within a wellhead, the lockdown sleeve comprising:*

*an upper portion; and*

*a lower portion coupled to the upper portion;*

*wherein the lockdown sleeve is capable of maintaining the lower portion stationary with respect to the casing hanger while an axial length of the lockdown sleeve is adjusted; and*

*a running tool, wherein the running tool is configured to install the lockdown sleeve into a wellhead and adjust*

*the axial length of the lockdown sleeve while the lockdown sleeve is in the wellhead; wherein the running tool comprises:*

*a main body, wherein an upper end of the main body is attached to a tool string;*

*a centralizer sub, wherein the centralizer sub is coupled to and extending in a radially outward direction from the main body, wherein the centralizer sub is coupled to the main body; and*

*a lock ring contained within a circumferential recess formed in the main body.*

*39. The system of claim 38, wherein the upper portion is rotatable with respect to the lower portion to adjust the axial length of the lockdown sleeve.*

*40. The system of claim 39, wherein the upper portion and the lower portion and threaded together.*

*41. The system of claim 38, wherein the upper portion and the lower portion each have substantially cylindrical shapes, and wherein the upper portion is disposed radially outward from the lower portion.*

*42. The system of claim 38, wherein the lockdown sleeve further comprises:*

*a lock ring connected to the upper portion; and*

*an actuator ring connected to the upper portion;*

*wherein the actuator ring functions to cause the lock ring to expand radially outward.*

*43. The system of claim 42, wherein the upper portion is capable of rotating with respect to the lower portion while the lock ring is expanded radially outward.*

*44. The system of claim 42, wherein the lockdown sleeve further comprises a shear pin connecting the actuator ring to the upper portion.*

*45. The system of claim 38, wherein the lower portion comprises a load shoulder for interfacing with the casing hanger.*

*46. The system of claim 38, wherein the lockdown sleeve further comprises a retractable key disposed along the lower portion for interfacing with the casing hanger.*

*47. A system, comprising:*

*a lockdown sleeve configured to retain a casing hanger within a subsea component, the lockdown sleeve being capable of having its axial length adjusted while the lockdown sleeve is located in the subsea component; and*

*a running tool, wherein the running tool is configured to install the lockdown sleeve into a wellhead and adjust the axial length of the lockdown sleeve while the lockdown sleeve is in the wellhead, wherein the running tool comprises:*

*a main body, wherein an upper end of the main body is attached to a tool string;*

*a centralizer sub, wherein the centralizer sub is coupled to and extending in a radially outward direction from the main body, wherein the centralizer sub is coupled to the main body; and*

*a lock ring contained within a circumferential recess formed in the main body.*

*48. The system of claim 47, wherein the lockdown sleeve has two portions that are movable with respect to each other to adjust the length of the lockdown sleeve while the lockdown sleeve is located in the subsea component.*

*49. The system of claim 48, wherein the two portions are rotatable with respect to each other.*

*50. The system of claim 49, wherein the two portions are threaded together.*

*51. A system, comprising:*

*a lockdown sleeve configured to retain a casing hanger within a wellhead, the lockdown sleeve comprising:*

*an expandable lock ring configured to expand radially outward into a corresponding profile on an inner diameter of a wellhead;*

*wherein the lockdown sleeve is capable of being axially adjusted while the lock ring is engaging the profile or after the lock ring is engaged with the profile; and*

*a running tool, wherein the running tool is configured to install the lockdown sleeve into a wellhead and adjust the axial length of the lockdown sleeve while the lockdown sleeve is in the wellhead, wherein the running tool comprises:*

*a main body, wherein an upper end of the main body is attached to a tool string;*

*a centralizer sub, wherein the centralizer sub is coupled to and extending in a radially outward direction from the main body, wherein the centralizer sub is coupled to the main body; and*

*a lock ring contained within a circumferential recess formed in the main body.*

*52. The system of claim 51, wherein the lockdown sleeve has a lower end for interfacing with the casing hanger, wherein the lockdown sleeve is capable of being axially adjusted after the lower end interfaces with the casing hanger.*

*53. A system, comprising:*

*a wellhead;*

*a casing hanger disposed in the wellhead;*

*a lockdown sleeve installed in the wellhead, the lockdown sleeve retaining the casing hanger within the wellhead, wherein the lockdown sleeve comprises:*

*a first portion located on the casing hanger; and*

*a second portion having a lock ring engaged with a profile on an inner diameter of the wellhead:*

*wherein a length of the lockdown sleeve is axially adjustable via relative axial movement between the first and second portions; and*

*a running tool, wherein the running tool is configured to install the lockdown sleeve into a wellhead and adjust the axial length of the lockdown sleeve while the lockdown sleeve is in the wellhead, wherein the running tool comprises:*

*a main body, wherein an upper end of the main body is attached to a tool string;*

*a centralizer sub, wherein the centralizer sub is coupled to and extending in a radially outward direction from the main body, wherein the centralizer sub is coupled to the main body; and*

*a lock ring contained within a circumferential recess formed in the main body.*

*54. The system of claim 53, wherein the second portion is rotatable with respect to the first portion to adjust the length of the lockdown sleeve.*

*55. The system of claim 53, wherein the first portion is stationary with respect to the casing hanger.*

*56. The system of claim 53, further comprising one or more retractable keys between the first portion and the casing hanger to maintain the first portion stationary with respect to the casing hanger.*

*57. The system of claim 53, wherein the lock ring of the second portion is engaged with an upper edge of the profile on the inner diameter of the wellhead.*

*58. The system of claim 53, wherein the lockdown sleeve further comprises an actuator ring configured to cause the lock ring to expand radially outward in response to axial*

*movement of the actuator ring to thereby engage the lock ring with the profile on the inner diameter of the wellhead.*

*59. A system, comprising:*

*a wellhead;*

*a casing hanger disposed in the wellhead;*

*a lockdown sleeve installed in the wellhead and retaining the casing hanger in the wellhead;*

*wherein the lockdown sleeve is axially adjustable to provide a connection between the casing hanger, the lockdown sleeve; and the wellhead for limiting axial movement between the casing hanger and the wellhead; and*

*a running tool, wherein the running tool is configured to install the lockdown sleeve into a wellhead and adjust the axial length of the lockdown sleeve while the lockdown sleeve is in the wellhead; wherein the running tool comprises:*

*a main body, wherein an upper end of the main body is attached to a tool string;*

*a centralizer sub, wherein the centralizer sub is coupled to and extending in a radially outward direction from the main body, wherein the centralizer sub is coupled to the main body; and*

*a lock ring contained within a circumferential recess formed in the main body.*

*60. The system of claim 59, further comprising a seal disposed between the casing hanger and the wellhead, wherein the connection between the casing hanger, the lockdown sleeve, and the wellhead deters movement of the seal in an axial direction.*

*61. The system of claim 60, further comprising:*

*an inner casing string coupled to the casing hanger;*

*an outer casing string disposed radially outside of the inner casing string;*

*wherein the seal is sealing an annulus between the inner casing string and the outer casing string.*

*62. The system of claim 59, wherein the lockdown sleeve is axially adjustable to apply a pre-load to the casing hanger in a downward direction.*

*63. The system of claim 59, wherein the lockdown sleeve comprises:*

*a first portion located on the casing hanger;*

*a second portion coupled to the first portion; and*

*a lock ring coupled to the second portion, the lock ring being engaged with a profile on an inner diameter of the wellhead;*

*wherein the lockdown sleeve is axially adjustable via movement between the first and second portions.*

*64. A method, comprising:*

*positioning a lockdown sleeve into a subsea component;*

*while the lockdown sleeve is inside the subsea component, adjusting an axial length of the lockdown sleeve;*

*rotating a running tool to adjust the axial length of the lockdown sleeve; wherein the running tool comprises a lock ring contained within a circumferential recess formed in a main body of the running tool, wherein rotating the running tool causes a centralizer sub of the lockdown sleeve to rotate with respect to a portion of the lockdown sleeve, wherein the portion of the lockdown sleeve remains stationary with respect to the wellhead; and*

*retaining a substantially cylindrical component within the subsea component via the lockdown sleeve.*

*65. The method of claim 64, wherein the lockdown sleeve comprises a first portion and a second portion, wherein adjusting the axial length of the lockdown sleeve comprises moving the second portion with respect to the first portion.*

*66. The method of claim 65, further comprising maintaining the first portion stationary with respect to the wellhead while adjusting the axial length of the lockdown sleeve.*

*67. The method of claim 65, further comprising actuating a lock ring connected to the first portion into a locking profile on an inner diameter of the wellhead.*

*68. The method of claim 65, wherein moving the second portion with respect to the first portion comprises rotating the second portion with respect to the first portion.*

*69. The method of claim 68, comprising rotating the second portion with respect to the first portion via a threaded connection between the first and second portions.*

*70. A method of installing a lockdown sleeve configured to retain a casing hanger within a wellhead, the method comprising:*

*actuating a lock ring of the lockdown sleeve toward a locking profile on an inner diameter of the wellhead;*

*during or after actuating the lock ring, adjusting an axial length of the lockdown sleeve; and*

*rotating a running tool to adjust the axial length of the lockdown sleeve, wherein the running tool comprises a lock ring contained within a circumferential recess formed in a main body of the running tool, wherein rotating the running tool causes a centralizer sub of the lockdown sleeve to rotate with respect to a portion of the lockdown sleeve, wherein the portion of the lockdown sleeve remains stationary with respect to the wellhead.*

*71. The method of claim 70, wherein adjusting the axial length of the lockdown sleeve comprises moving a portion of the lockdown sleeve having the lock ring in an axial direction with respect to the wellhead.*

*72. The method of claim 70, wherein the lockdown sleeve comprises a first portion and a second portion, the method further comprising:*

*maintaining the first portion stationary with respect to the wellhead during the axial length adjustment.*

*73. The method of claim 70, further comprising locking the lockdown sleeve against the wellhead in response to adjusting the axial length of the lockdown sleeve.*

*74. The method of claim 73, wherein locking the lockdown sleeve against the wellhead comprises engaging the lock ring with an uppermost edge of the locking profile.*

*75. The method of claim 74, wherein:*

*actuating the lock ring toward the locking profile comprises actuating the lock ring into the locking profile, and*

*adjusting the axial length of the lockdown sleeve moves the lock ring into engagement with the uppermost edge of the locking profile.*

*76. The method of claim 73, further comprising:*

*after locking the lockdown sleeve against the wellhead, further adjusting the axial length of the lockdown sleeve to apply a pre-load to the casing hanger in the wellhead.*

*77. The method of claim 70, wherein actuating the lock ring comprises transferring downward axial force from an actuator ring of the lockdown sleeve into outward radial expansion of the lock ring.*

*78. The method of claim 77, further comprising:*

*prior to actuating the lock ring, converting force applied to the actuator ring into downward movement of the lockdown sleeve until the lockdown sleeve contacts a landing shoulder on the casing hanger in the wellhead.*

*79. The method of claim 78, further comprising shearing a shear pin between the actuator ring and an upper portion*

*of the lockdown sleeve to enable axial movement between the actuator ring and the lock ring connected to the upper portion.*

*80. A method, comprising:*

*positioning a lockdown sleeve into a wellhead;*

*holding a lower portion of the lockdown sleeve stationary with respect to a casing hanger in the wellhead; and*

*rotating a running tool to adjust the axial length of the lockdown sleeve, wherein the running tool comprises a lock ring contained within a circumferential recess formed in a main body of the running tool, wherein rotating the running tool causes a centralizer sub and an upper portion of the lockdown sleeve to rotate with respect to the lower portion of the lockdown sleeve, wherein the lower portion of the lockdown sleeve remains stationary with respect to the wellhead.*

*81. The method of claim 80, further comprising landing the lower portion on a landing shoulder of the casing hanger.*

*82. The method of claim 80, comprising holding the lower portion stationary with respect to the casing hanger via one or more retractable keys disposed between the lower portion and the casing hanger.*

*83. The method of claim 80, further comprising:*

*radially expanding a lock ring connected to the upper portion into a locking profile of the wellhead; and*

*during or after expanding the lock ring, rotating the upper portion to adjust the axial length of the lockdown sleeve.*

*84. A method, comprising:*

*retaining a casing hanger in a wellhead via a lockdown sleeve landed on the casing hanger; and*

*axially adjusting a length of the lockdown sleeve to limit movement between the casing hanger and the wellhead, wherein axially adjusting the length of the lockdown sleeve comprises rotating a running tool, wherein the running tool comprises a lock ring contained within a circumferential recess formed in a main body of the running tool, wherein rotating the running tool causes a centralizer sub of the lockdown sleeve to rotate with respect to a portion of the lockdown sleeve, wherein the portion of the lockdown sleeve remains stationary with respect to the wellhead.*

*85. The method of claim 84, wherein axially adjusting the length of the lockdown sleeve comprises rotating a first portion of the lockdown sleeve with respect to a second portion of the lockdown sleeve.*

*86. The method of claim 85, wherein the first portion is landed on the casing hanger and the second portion is connected to a lock ring, the method further comprising:*

*actuating the lock ring into a locking profile of the wellhead.*

*87. A method for sealing a space within a wellhead, comprising:*

*locating a seal between a casing hanger and a radially inner surface of the wellhead;*

*locating a lockdown sleeve in the wellhead; and*

*axially adjusting the lockdown sleeve in the wellhead to provide a connection between the casing hanger, the lockdown sleeve, and the wellhead, wherein axially adjusting the length of the lockdown sleeve comprises rotating a running tool, wherein the running tool comprises a lock ring contained within a circumferential recess formed in a main body of the running tool, wherein rotating the running tool causes a centralizer sub of the lockdown sleeve to rotate with respect to a portion of the lockdown sleeve, wherein the portion of the lockdown sleeve remains stationary with respect to the wellhead.*

*88. The method of claim 87, wherein the connection deters movement of the seal.*

*89. The method of claim 87, further comprising preloading the casing hanger and the seal via the axial adjustment of the lockdown sleeve in the wellhead.*

*90. A system, comprising:*

*a lockdown sleeve configured to retain a first member within a second member having a hollow passage, the lockdown sleeve being capable of having its axial length adjusted while the lockdown sleeve is located in the hollow passage of the second member; and*

*a running tool, wherein the running tool is configured to install the lockdown sleeve into a wellhead and adjust the axial length of the lockdown sleeve while the lockdown sleeve is in the wellhead, wherein the running tool comprises:*

*a main body, wherein an upper end of the main body is attached to a tool string;*

*a centralizer sub, wherein the centralizer sub is coupled to and extending in a radially outward direction from the main body; wherein the centralizer sub is coupled to the main body; and*

*a lock ring contained within a circumferential recess formed in the main body.*

*91. The system of claim 90, wherein the lockdown sleeve comprises:*

*a first portion; and*

*a second portion coupled to the first portion;*

*wherein the first and second portions are rotatable with respect to each other to change the axial length of the lockdown sleeve.*

*92. The system of claim 90, wherein the lockdown sleeve is configured to retain a first tubular member within a second tubular member.*

* * * * *